United States Patent [19]
Connor

[11] Patent Number: 5,864,456
[45] Date of Patent: Jan. 26, 1999

[54] CLOCK LINE OVER-CURRENT PROTECTOR AND INDUSTRIAL CONTROL SYSTEM EMPLOYING SAME

[75] Inventor: David Eugene Connor, Cary, N.C.

[73] Assignee: Square D Company, Palatine, Ill.

[21] Appl. No.: 996,607

[22] Filed: Dec. 23, 1997

[51] Int. Cl.$^6$ ................................................... H02H 3/00
[52] U.S. Cl. ............................... 361/93; 361/78; 361/87; 327/72; 327/380
[58] Field of Search .................... 361/78, 86, 87, 361/88, 93; 327/72, 380

[56] References Cited

U.S. PATENT DOCUMENTS

| | | | |
|---|---|---|---|
| 3,727,107 | 4/1973 | Fujie et al. | 361/86 |
| 4,346,423 | 8/1982 | Matthes et al. | 361/87 |
| 4,811,136 | 3/1989 | Jones et al. | 361/79 |
| 5,287,010 | 2/1994 | Hagiwara | 307/269 |
| 5,347,233 | 9/1994 | Ishibashi et al. | 331/2 |

*Primary Examiner*—Jeffrey Gaffin
*Assistant Examiner*—Kim Huynh
*Attorney, Agent, or Firm*—Michael J. Femal; Larry I. Golden

[57] ABSTRACT

A clock line over-protection circuit (28) carried on an interface card (16) for interfacing synchronous clock line (20), power line (22), DC common line (24) and data line (26) between a host computer (12) and a plurality of data link modules (14) with a plurality of associated controlled devices (18) including a series resistor (52) interconnected between a clock disable switch (52) and a clock signal generating amplifier (48) and a current sensor circuit (64, FIG. 3) connected across the series resistor (50) to produce a current sensor signal on an output (62). The current sensor signal is integrated by an over-current protection circuit (58, FIG. 4) to produce an over-current detection signal that varies with the difference in the clock line current magnitude during clock signal phases of opposite polarity. A clock switch control circuit (54) actuates the clock disable switch (52) to turn off and to protectively disconnect the clock line (20) and the data link modules (14) coupled therewith from the clock signal generating amplifier (48). A latch (170, FIG. 6) maintains the clock disable switch (52) in the protective off state until reset and a circuit (110, 126) provides hysteresis to the clock switch control circuit (54) to prevent resetting while the over-current condition persist.

18 Claims, 6 Drawing Sheets

CLOCK LINE OVER-CURRENT PROTECTOR AND INDUSTRIAL CONTROL SYSTEM EMPLOYING SAME

BACKGROUND OF THE INVENTION

1. Field of the Invention:

This invention generally relates an over-current protection circuit and, more particularly, to an over-current protection circuit especially adapted for protecting a synchronous clock line bus employable in industrial control systems and an industrial system employing same.

2. Description of the related art including information disclosed under 37 C.F.R. 1.97–1.99:

Industrial control systems, such as the parallel bus digital control systems shown in U.S. Pat. No. 4,808,994 issued Feb. 28, 1989, to Riley for "LOGIC INTERCHANGE SYSTEM" and shown in U.S. Pat. No. 5,553,070, issued Sep. 3, 1996, to Riley for "DATA LINK MODULE FOR TIME DIVISION MULTIPLEXING CONTROL SYSTEM", have networks with extensive bus cables. These busses, bus lines, or lines, in an industrial setting, span the factory floor between a host computer or other data termination point and a plurality of data link modules. The data link modules, in turn, are connected with one or more associated controllable devices which are controlled to perform an active function in response to data on the data line or to convey data onto the data line. Because of the factory floor environment, such network bus lines are vulnerable to cuts and resultant short circuits, or shorts.

Accordingly, in such networks it is known to provide over-current protection circuits. These over-current protection circuits detect current in the data bus line circuitry and automatically protectively break the data line circuit in the data bus when the current exceeds a preselected maximum current threshold level to protect the data bus and the associated circuitry.

The data bus, or data line, is an open drain circuit and only conducts current when active. Therefore, excess current in the data line is detected by a current sinking device at an interface circuit, or interface card, only during a clock sync period when all the loads on the data line are inactive, and the total normal load on the data line is known. This enables selection of the correct maximum current threshold level regardless of the number of control modules or the topology in which they are arranged, such as daisy chain, star, loop, loop with branches, trunk, trunk with branches, single branch, etc.

However, the clock line circuit is not open drain but rather has a so-called, totem-pole output that sinks and sources current only at the clock source at the interface card and is free running except during the periodic sync pulse. Consequently, the in-rush current in the charging and discharging of the network clock line varies with the many variations of the wiring topologies and variations in the load. The maximum current threshold level detection method successfully employed with respect to the data line is therefor not well adapted to use with respect to protecting the data line against excessive currents. The level at which the maximum, current threshold level should be set is indeterminate due to the current sinking being performed at the plurality of loads on the line.

Because of this circumstance, the known technique of relying upon absolute current levels to detect a short circuit condition on the clock line results in either false detecting of over-current conditions or in permitting existence of an excess current condition sufficiently long enough to stress the clock driver circuit.

In order to over come this problem, another technique has been known to be employed to prevent over-current conditions in the clock line. In this other technique the clock voltage waveform is monitored to compare the "incoming" clock with the "out-going" clock. The incoming clock is the signal seen on the bus cable at the clock source on the interface card 16. The out-going clock is "expected" clock as generated. Disadvantageously, the implementation of this comparison technique requires complex hardware implementation, exposes the components to destructive excess current, or requires a separate microprocessor to control. This method is also subject to false triggering by electrical noise.

SUMMARY OF THE INVENTION

It is therefore the principal object of the present invention to provide an over-current clock line protector that overcomes the disadvantages of the known over-current protection devices, particularly as employed to protect the network clock line of an industrial control system.

This object is achieved by providing a clock line over-current protector with a switch for selectively interconnecting a source of clock signals and the clock line, and means for controlling the switch to disconnect the source of clock signals from the clock line in response to a difference in the clock line current during clock phases of opposite polarity exceeding a preselected threshold.

In the preferred embodiment clock line over-current protector includes means for producing a current sensor signal representative of the magnitude of the current through the switch when it is conducting clock line current.

In the preferred embodiment the switch controlling means includes a detection circuit for integrating the current sensor signal to produce an over-current detection signal with a magnitude that varies with respect to a preselected reference with the integral of the current sensor signal over at least a full cycle of the current sensor signal. The over-current detection circuit includes a first integrating circuit for producing a positive integral signal relative to the reference representative of the integral of the sensor signal during transitions of a first polarity of the current sensor signal, a second integrating circuit for producing a negative integral signal relative to the reference representative of the integral of the sensor signal during transitions of a second polarity of the current sensor signal opposite to the first polarity, and means for summing the positive integral signal with the negative integral signal to produce the over-current detection signal. The over-current detection signal varies above and below the reference to the extent the positive integral signal is greater than and less than the negative integral signal.

BRIEF DESCRIPTION OF THE DRAWINGS

The foregoing objects and advantageous features are described in detail and others are made apparent from the following detailed description of the preferred embodiment of the load independent, clock line, over-current protector and the industrial control system employing same of the present invention which is given with reference to the several views of the drawing, in which.

DESCRIPTION OF THE PREFERRED EMBODIMENT

Figure 1:
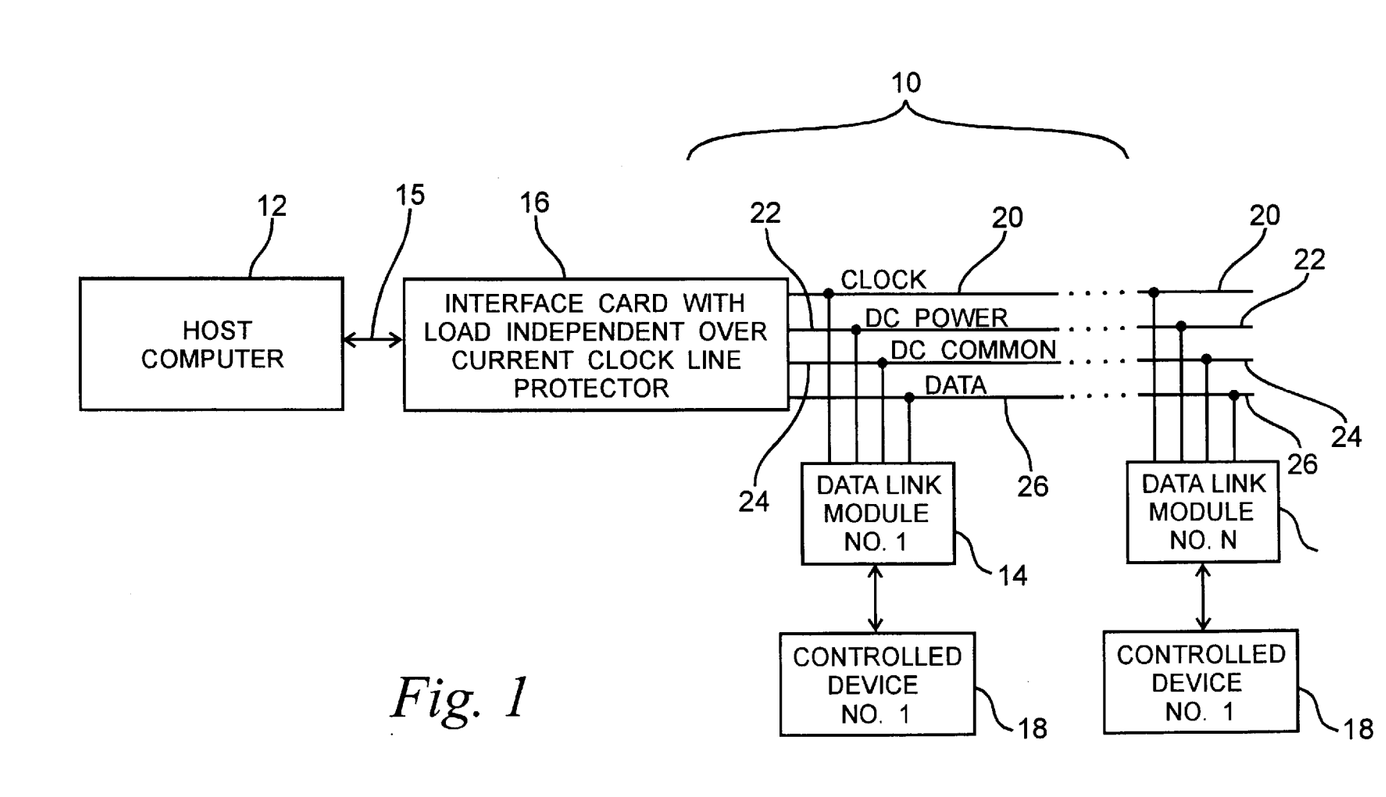
FIG. 1 is a functional block diagram of an industrial control system, or network, in which the preferred embodiment of the load independent, clock line, over-current protector of the present invention is advantageously employed.

Referring to FIG. 1, the preferred embodiment of the load independent, clock line, over-current, line protected control system 10 of the present invention, is seen to include a host computer 12 interconnected with a plurality of substantially identical data link modules 14 through a computer connection cable 15 and an interface card 16 with a load independent, clock line, over-current protector, or protector circuit, 16. The data link modules 14, in turn, are connected with associated controlled devices 18, as described above, such as temperature sensors, actuators and the like. There are N data link modules 14 with at least one controlled device 16 associated with each module, where N is a plural, positive integer.

In a large industrial setting, N is a number on the order of several hundred. In an automotive setting, N is a number on the order of ten. In any event, each one of the data link modules 14 are connected in parallel to four bus lines, or lines: a clock line 20, a DC power line 22, a DC common line 24 and a data line 26. These bus lines sometimes extend hundreds of yards across a factory floor and, as previously noted, are subject to being cut. The modules 14 are arranged in one or a combination of various topologies, such as daisy chain, star, single branch, trunk with branches, loop with branches, etc. which affects the length of the bus lines. The number of data link modules 14 and their relative location determines the length of the bus lines. Variations in the number, relative location and topological configuration of the data link modules 14 therefore result in variations of the load on, and the normal range of current through, the bus lines including the clock line 20.

Figure 2:
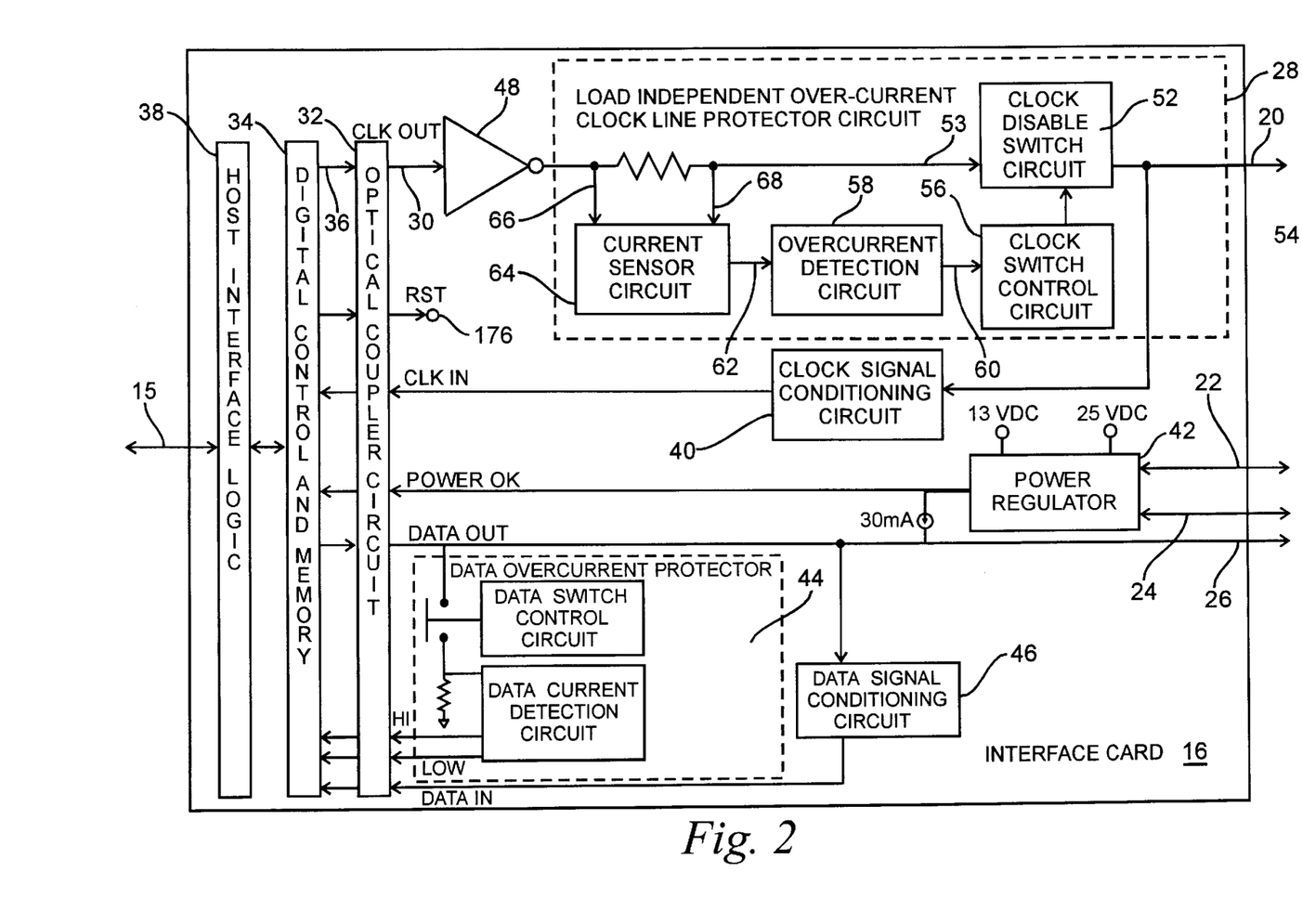
FIG. 2 is a functional block diagram of the interface card functional block of FIG. 1 showing the load independent, clock line, over-current protector in functional block form.

Advantageously, the over-current clock line protector 28, FIG. 2, of the present invention functions successfully without regard to such variations in load and in the normal operating range of current through the clock line. As will be explained in greater detail below, load independence is achieved by integrating the clock line current over a full cycle, or period, of the clock signal. This integration results in an average over-current detection signal relative to a preselected reference of zero unless there is a short circuit in the clock line.

It has been determined that in the event of a clock line short the current during positive clock edge transitions vary from the current during negative clock edge transitions during free running operation of the clock between sync pulses. Preferably, the result of a clock edge current to voltage conversion is stored in a capacitor during positive transitions of the clock signal and compared with the result of an opposite clock edge current to voltage conversion stored in another capacitor during negative transitions to determine whether there is an over-current condition in the clock line 20. Thus, the capacitive charge and discharge properties of the clock line transmission cabling, which do not significantly vary with variations of the normal load, are utilized. A balance of charging current and discharging current through a series resistor in the clock line results in development of a difference signal that does not vary from a preselected reference level. A positive going error from the reference level is caused by the current magnitude during the clock line charging cycle being greater than during the clock line discharging cycle. A negative going error from the reference level is caused by the current magnitude, during the discharging cycle, being greater than that during the charging cycle. A circuit sensitivity of approximately 12 mv/ma., or twelve ohms, is achieved.

Referring now to FIG. 2, the interface card 16, shown as a functional block in FIG. 1, is seen to include among other elements that are known, the load independent, clock line over-current protector, or protector, 28 of the present invention. The protector 28 provides the clock output line 20 with over-current protection. The clock output line 20 is coupled to a CLKOUT output 30 of an optical coupler circuit 32, which is one of the known elements of the interface card 16. A digital control and memory circuit 34 includes a clock signal generator (not shown) that produces a relatively nonamplified generally square-wave clock signal on an output terminal 36 that is applied to an input of the optical coupler 32 associated with the CLKOUT terminal 30.

The optical coupler circuit 32 couples the input clock signal from the digital control and memory circuit 34 to the CLKOUT terminal 30 while also providing electrical isolation between the digital control and memory circuit 34 and the clock line 20 and the various loads connected to the clock line 20. A host computer interface logic circuit 38, which interfaces the digital control and memory circuit 34 with the host computer 12, FIG. 1, via backplane interface or computer cable 15, is also protected by the electrical isolation provided by the optical coupler circuit 32.

Other conventional elements of the interface card 16 include a clock signal conditioning circuit 40, a power regulator 42, a data current protector circuit 44 and a data signal conditioning circuit 46. These conventional elements of the interface card, elements 32, 34, 38, 40, 42, 44 and 46, are shown and described in the aforementioned patents of Riley, all of which are hereby incorporated by reference. In addition, interface cards for the Seriplex system with these known elements are available for purchase from Square D Company or their distributors. With respect to more detailed information concerning the system elements 12, 14 and 18 shown in FIG. 1, the nature of the clock signal and the data signal and the method of digital communication that is employed by the system, operation of the clock signal conditioning circuit 40, the data over-current protector circuit 44 and the digital signal conditioning circuit 46, reference should be made to the aforementioned U.S. patents of Ryan and to Seriplex Design, Installation, and Troubleshooting Guide, published by Square D Company in February 1997, all of which are hereby incorporated by reference.

Figure 6:
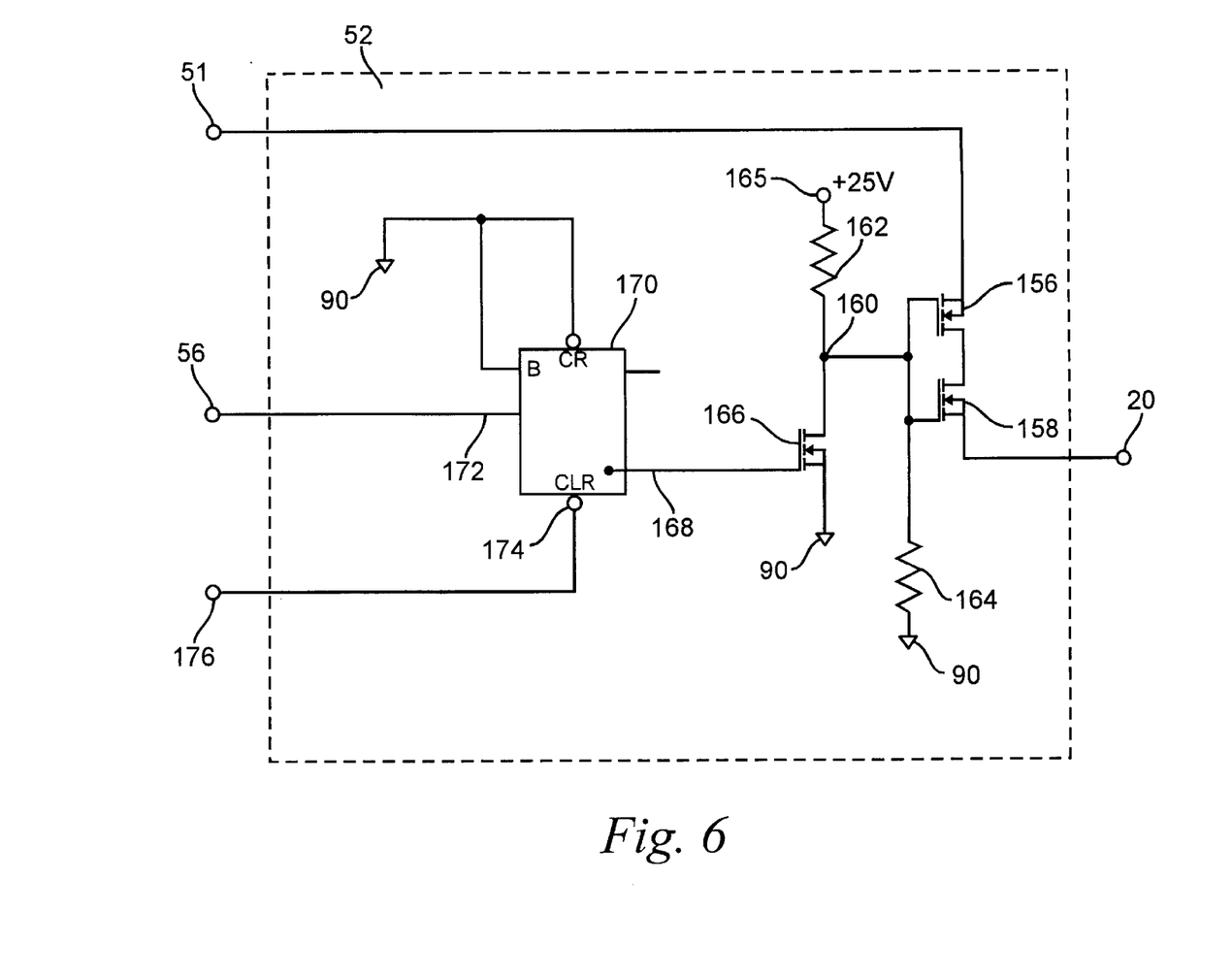
FIG. 6 is a circuit schematic of the preferred form of the clock disable switch functional block of FIG. 2.

Still referring to FIG. 2, the load independent protector circuit 28 of the present invention is seen to protect a clock signal drive amplifier 48, preferably a TC4426 amplifier made by Telcom Semiconductor, Inc., or the like. The output of the clock signal generating drive amplifier is coupled to a current sensing series resistor 50 of the protector 28. The current sensing series resistor 50 is preferably a 23.7-ohm, ½ watt ceramic type resistor 50. An electronic clock disable switch circuit 52, described below in detail with respect to FIG. 6, is connected in series between the series resistor 50 and the output clock line 20 at the output of the switch control circuit. The clock disable switch circuit 52 has an input 53 connected to receive generated input clock signals from a clock signal generating drive amplifier 48 which, in turn, is driven by the signal from the CLKOUT terminal 30. The clock disable switch circuit 52 is controlled by a clock switch control circuit 54 via control signals on a switch control output 56 connected to a control input of the clock switch circuit 52. Control signals on output 56 determine whether the input clock signals at input 53 are passed through to the output of the disable control switch circuit 52 and thus to the to the clock output line 20, and vice versa. When actuated by the clock control signal on output 56, the clock disable switch circuit 52 creates an open circuit between the clock amplifier 48 and the clock output line 20. The control signal actuates the clock disable switch circuit 52 in response to an over-current condition being detected by an over-current detection circuit 58.

Detection of an over-current condition results in a detection signal being generated on a control output 60 connected to a detection input of the clock switch control circuit 54. The over-current detection circuit 58 receives current signals from an output 62 of a current sensor circuit 64 that are representative of the magnitude of the clock line current through the series resistor 50. The opposite sides of the series resistor 50 are respectively coupled to an associated pair of inputs 66 and 68 of the current sensor circuit 64 which produces a current on its output 62 that preferably varies proportionally with variations in the current through the series resistor 50.

Figure 3:
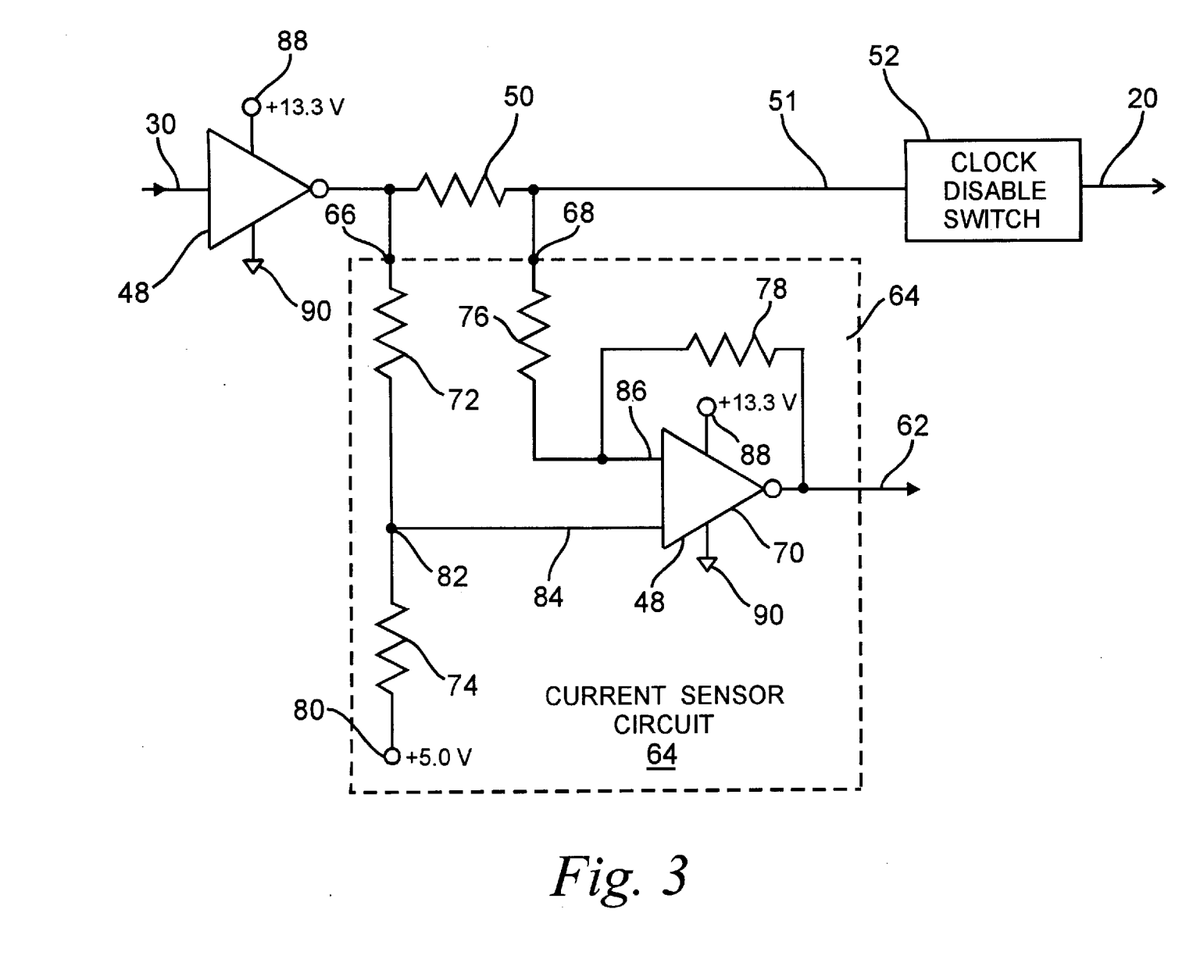
FIG. 3 is a circuit schematic of the preferred form of the current sensing functional block of FIG. 2.

Referring to FIG. 3, the clock line driver amplifier 48 preferably is a high current MOSFET driver with a maximum output impedance of six ohms. It exhibits a maximum switching interval of thirty nanoseconds, when driving a capacitive load of up to one thousand picofarads. Preferably the amplifier is a TCA4426A MOSFET type amplifier made by Telcom Semiconductor, Inc. The clock output line 20 has a maximum distributive capacitance of 50,000 picofarads but often is much less. The series resistor preferably has a resistance of 23.7 ohms.

A differential amplifier 70, preferably a LM6132 differential amplifier made by National Semiconductor, is used to sense the current in the series resistor 50. The differential amplifier 70 is biased by resistors 72, 74, 76 and 78 to have unity voltage gain. Resistors 72 and 74 each have a value of ten Kohms and are connected in series between input 66 at one side of the series resistor 50 and a positive five volt DC supply 80. The juncture 82 between the resistors 72 and 74 is connected to a noninverting input 84 of the differential amplifier 70. Resistor 76 is connected from the input 68 at the other side of the series resistor 50 to an inverting input 86 of the differential amplifier 70. Resistor 76 forms a voltage divider with the resistor 78 which is connected to provide feedback between the differential amplifier and current sensor output 62, and the juncture of the resistor 76 and the inverting input 86. Each of the resistors 76 and 78 has a resistance of ten Kohm. Each of the amplifiers 48 and 70 are powered by a 13.3 DC voltage power supply 88 relative to a ground reference 90.

The magnitude of the output voltage on output 62 of differential amplifier 70 at any time is equal to the voltage drop across the series resistor 50 referenced to the positive five volt reference provided by DC power supply 80. During conduction intervals of the clock signal appearing on the clock line 20, when there is no short circuit on the clock line 20, the magnitude of the clock line current through the series resistor 50 is equal to the clock signal voltage divided by the characteristic impedance of the line. This clock line current is approximately equal and opposite for each half-cycle of the clock signal. Consequently, the net clock line current for a complete cycle, or period, of the clock signal is substantially zero under normal operating conditions.

Assuming an output impedance Zo of approximately one hundred ohms, and a clock signal amplitude of approximately twelve volts, then the resultant clock line current in either polarity direction is approximately one hundred milliamperes. The propagation time of the clock signal is approximately equal to a quarter of a clock period of approximately 1.25 to 25 microseconds over the possible clock rate range. The peak voltage across the 23.7 ohm series resistor 50 is therefore approximately equal to +/−2.4 volts, with the net voltage being zero for a complete clock period.

Still referring to FIG. 3, amplifier 48 is a high current driver capable of delivering up to 1.5 amperes to the load. Series resistor 50 advantageously performs a dual function. First, it provides sufficient source impedance to control the reflective energy on the clock line 20 from the network of data link modules 14, FIG. 1. Secondly, the series resistor 50 functions as a sensing element used by the current sensor circuit 64 to indirectly measure the clock line charge current and the clock line discharge current. This measurement is achieved through use of the amplifier 70 which is configured as a true differential amplifier with a voltage gain of unity, referenced to +5.0-DC volts.

The clock voltage signal, a generally square wave at a frequency of approximately ten to two hundred KHz, is developed across series resistor 50 and inverted and redriven by differential amplifier 70. The load seen at output of amplifier 48 is essentially the series resistor 50 in series with the characteristic transition line impedance of the clock line 20 when the disable switch circuit is in an enable state. The characteristic impedance of the clock transmission line is approximately equal to one hundred ohms. Thus, the total output load seen by the output of the amplifier 48 is equal to approximately 124-ohms. When in a relatively nonconducting state, the output of amplifier 48 is very close to Vcc, i.e., the +13.3 DC volts of the DC power supply 88. This voltage level will create a steady-state charging current of approximately 105-ma to flow from the amplifier 48 to the load on the clock line 20.

When in a conductive state, the output 62 of amplifier 70 is essentially connected to ground reference potential at the ground reference 90. During this time period, a discharge current of the same magnitude as the charging current flows into the drive amplifier 48 from the distributive capacitive load of the clock line 20 during normal operating conditions.

The charging current of 105-ma results in a 2.5-volt drop across series resistor 50 in one polarity direction as viewed from the output of the drive amplifier 48. Conversely, the discharge current results in an equal but opposite polarity voltage drop across the series resistor 50.

The voltage at the output of differential amplifier 70 is equal to the +5.0-DC volt reference voltage of DC power supply 80 when there is no current in series resistor 50. The charging current of 105-ma causes the voltage at the output 62 of differential amplifier 70 to increase by the amount of the voltage drop across the series resistor 50, or 2.5 DC volts, to a voltage of +7.50 DC volts. The discharge current through the series resistor 50 results in an equal but opposite excursion from the +5.0 DC volts to +2.50 DC volts.

The clock line current flows through the series resistor 50 only for the time interval during which the clock line 20 is being charged, or discharged. Other than during the charge and discharge time intervals, the clock line 20 presents a virtually open circuit to the output of the drive amplifier 48. Consequently, during these times, the current through series resistor 50 is approximately zero.

The actual clock line charge time and discharge time is primarily dependent upon the length of the clock line 20, and the propagation velocity in the clock line 20. In the case of a relatively short clock line 20, with a total length of a few hundred feet or less, the portion of each half cycle of the clock signal during which there is current through the series resistor 50 is relatively short in duration. In the case of a relatively longer clock line 20, with a total length of approximately several thousand feet, the load current through the series resistor 50 is capable of continuing throughout the entire duration of the half cycle of the output clock signal. The actual percentage of the clock period during which charge or discharge current flows is, of course, determined by the clock frequency. A frequency in the range of ten KHz to two hundred KHz is suitable for use with the preferred embodiment of the protector circuit 28.

As previously noted, the charge and discharge of a nominal transmission line results in a voltage range at the output of differential amplifier 70 from +7.5-volts, during charging, to +2.5-volts, during discharging. The output is +5.0-volts when the load current through series resistor 50 is zero.

Figure 4:
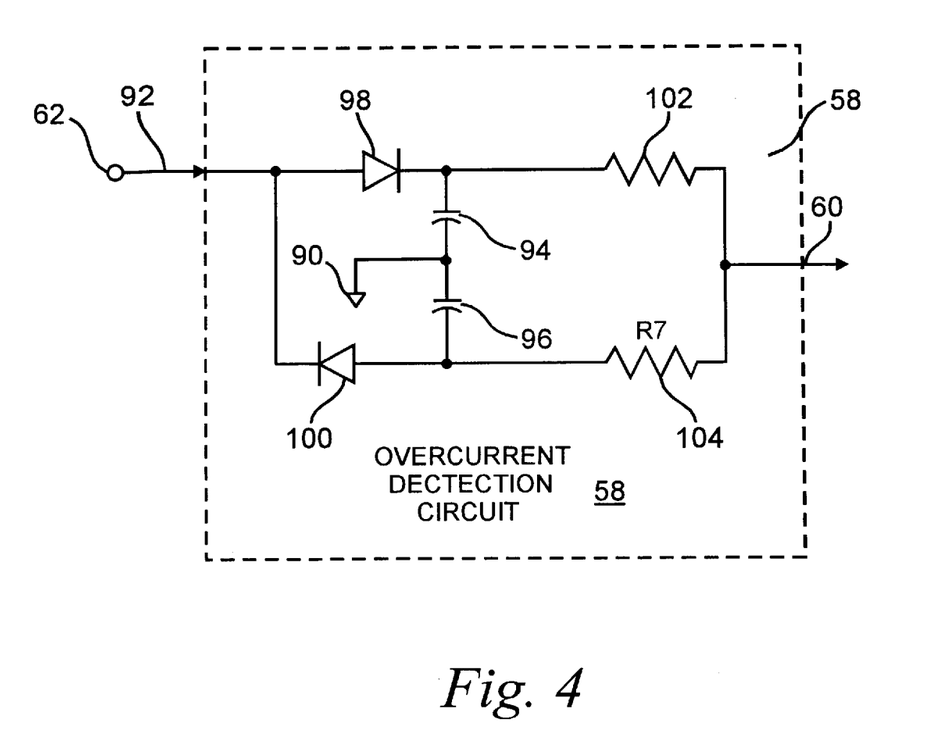
FIG. 4 is a circuit schematic of the preferred form of the over-current detection functional block of FIG. 2.

Referring now to FIG. 4, the preferred form of the over-current detection circuit 58 of FIG. 2, is seen to have an input 92 connected with the output 62 of the current sensor circuit 64 of FIG. 3 and an output 60 for providing an over-current detection signal to the clock switch control circuit 54, FIG. 2. When the voltage on output 62 of the current sensor circuit 64 is +5.0-volts, a pair of capacitors 94 and 96 are charged asymptotically toward this +5.0-volts. The charging current passes respectively through connections with the output 62 via a pair of diodes 98 and 100, the opposite sides of which are attached to ground reference potential 90. During the charging cycle, capacitor 94 charges to a value equal to the +7.5-DC volt peak less the voltage drop across the diode 98 of approximately 0.7-DC volt, for a net value of approximately +6.8-DC volts. During the discharging cycle, capacitor 96 discharges to a value equal to the +2.5-DC volt peak plus the voltage drop of 0.7-DC volt across the diode 100, for a net value of approximately 3.2-DC volts.

A pair of resistors 102 and 104 is connected between the output 60 and the junctures of the diode 98 and the capacitor 94, and the juncture of the diode 100 and the capacitor 96, respectively. The capacitors 94 and 96 each have a capacitance of 0.01-microfarad. The resistors 102 and 104 have an equal resistance of approximately 20-Kohms to form a voltage divider that produces a voltage at their junction connected to output 60 that is equal to the voltage across capacitor 96 plus half of the difference voltage between capacitors 94 and 96. Performing the mathematical calculation of 3.2 V+(6.8 V−3.2 V)/2 results in a value of +5.0-volts. Thus, the over-current detection circuit 58 effectively cancels the charge/discharge currents of the clock line 20 and produces an output detection voltage on output 60 that is proportional to the difference in the charge and discharge currents.

When a voltage source of +13.3-volts is connected to the clock line during each half cycle that the output of drive amplifier 48, FIG. 3, is high, current in the series resistor 50 is reduced to 43-ma. [(13 V−12 V)/23.7-ohm]. During the half cycle when the output of the drive amplifier 48, FIG. 2, is low, current in series resistor 50 is equal to approximately 500-ma. [13.3 V/23.7-ohms]. The voltage signal seen at the inputs of the differential amplifier 70 is then +1.0-volts and −12.0-volts. The voltage at the output 62 of the differential amplifier 70 ranges from +6.0-volts during the peak of the charging period, to zero volts, or ground reference potential at the end of the discharge period. The corresponding voltage at the junction of resistors 102 and 104 is +3.0-volts.

If the differential amplifier 70 remained linear over the entire range of the input voltage, the voltage level at the output 60 at the juncture of resistors 102 and 104 would be −0.5 volts. However, the amplifier output 62 is capable of negative transitions only from +5.0 volts to ground, and is capable of moving positively only from +5.0 volts to Vcc, the +13.3-volts of the power supply 88.

In the linear region of operation, the amplifier output voltage changes by approximately 25-mv per 1-ma of current change of the current in the series resistor 50, and the voltage at the detection output 60 changes by approximately 12-mv per 1-ma of current change of the current in the series resistor 50. Thus, the linear response has a load current range of approximately 200-ma in either polarity direction before occurrence of output clamping.

When the output of the drive amplifier 48, FIG. 3, is connected to ground reference 90, the load current is virtually zero, and no voltage is developed across the series resistor 50. During the half-cycles when the drive amplifier 48 drives its output into a high voltage state, the load current is limited only by the series resistor 50 to a value of approximately 550-ma. [13.3 V/23.7-ohm]. The resultant output voltage of amplifier 48 is +5.0 volts for the zero current phase and a voltage equal to the +13.3-volts of the power supply 88 for the 550 ma of current phase. The output voltage at the output 60 of the over-current detection circuit 58, FIG. 4, is +9.0-volts.

In summary, a balance of charging current and discharging current through the series resistor 50 results in a difference signal at output 60 at the juncture of resistors 102 and 104 that does not vary from the +5.0-volt reference level. A positive going excursion of the voltage level on output 60 from the reference level is caused by the clock line current magnitude during the charge cycle being greater than that during the discharge cycle occurs at the onset of a short in the clock line 20. On the other hand, a negative going excursion of the voltage on output 60 from the five volts reference level is caused by the clock line current magnitude during the discharging cycle being greater than that during the charging cycle which also occurs at the onset of a short in the clock line 20. The sensitivity of the over-current detection circuit is approximately 12-mv/ma, or twelve ohms.

Figure 5:
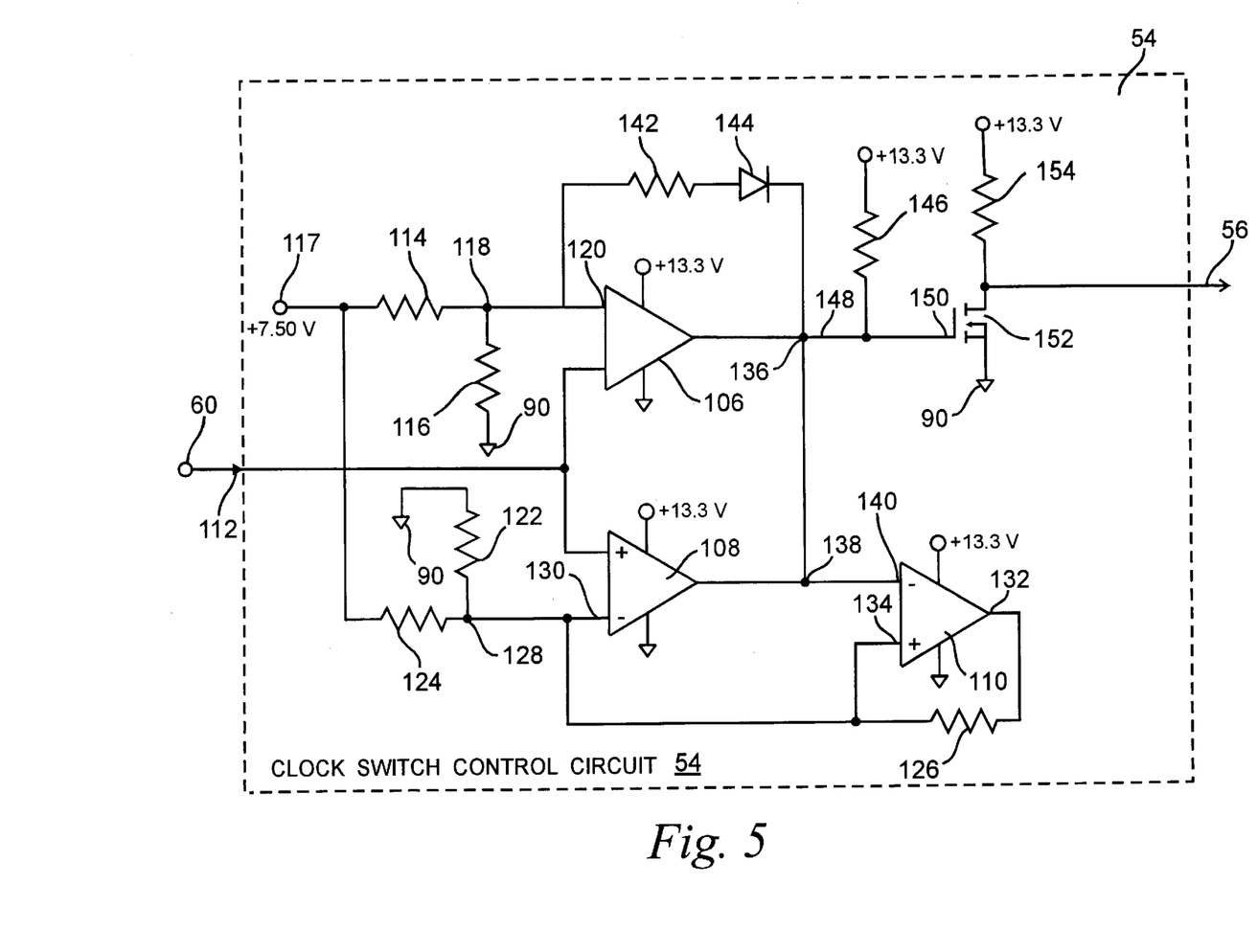
FIG. 5 is a circuit schematic of the preferred form of the clock switch control functional block of FIG. 2.

Referring now to FIG. 5, the clock switch control circuit 54 is seen to include three comparator amplifiers 106, 108 and 110, preferably all LM2903 comparators made by National Semiconductor. In cooperation with each other, these three comparator amplifiers 106, 108 and 110 form a "window" comparator circuit with hysteresis that establishes error voltage thresholds for responding to the over-current detection signal produced on the output 60 of the over-current detection circuit 58.

The input 112 of the clock switch control circuit 54 is connected to the output 60 of the over-current detection circuit 58. Accordingly, when there is no over-current condition the detection voltage signal at input 112 is approximately at the +5.0-volt reference level. A charge current error threshold of +6.0-volts is established by voltage division performed by resistors 114 and 116 interconnected in series circuit between ground reference 90 and a +7.5-volts power source reference 117. The resistor 114 has a resistance of 10-Kohm, and the resistor 116 has a value of 40.2-Kohm to produce a DC voltage of +4-volts at their juncture 118 connected to the noninverting input 120 of the comparator amplifier 106.

A discharge current threshold of +4.0-volts is therefore established by the voltage division circuit formed by the resistors 122, 124 and 126 in conjunction with the +7.5-volt power source reference 117. The resistor 122 is 15-Kohm, and the resistor 124 is 10-Kohm. They are connected in series between the +7.5-volt reference 117 and ground reference 90, with their juncture 128 coupled to the inverting input 130 of the comparator amplifier 108. The resistor 126 has a value of 47.5-Kohm and is interconnected between the output 132 and a noninverting input 134 of the comparator amplifier 110 which, in turn, is connected to the juncture 128 and the inverting input 130 of the comparator amplifier 108. The outputs 136 and 138 of the comparator amplifiers 106 and 107, respectively, are interconnected with each other and also to the inverting input 140 of the comparator amplifier 110. A bias resistor 142 having a resistance of 84.5-Kohm couples the juncture 118 through a diode 144 to both of the outputs 136 and 138 to establish hysteresis thresholds.

A load resistor 146 having a value of 10-Kohm couples the 13.3-volt power source 88 to a common output connection 148 joined to outputs 136 and 138 to normally hold them in a positive voltage state. This normal positive output signal on common output 148 is connected to a control input 150 of a transistor 152 to normally maintain it in an on state to couple ground reference 90 to output 56 to maintain a normally low output signal on switch control output 56. However, if the error detection signal applied to input 112 from detection circuit output 60 exceeds the +6.0-volt error detection voltage threshold, the output of comparator amplifier 106 switches to a low voltage state. A low voltage at the gate 150 of transistor 152 switches it off, and a load resistor 154 connecting the 13.3-volt power source 88 to the output 56 raises the control signal voltage on the control output 56 to a high voltage level.

A low voltage state at the output 136 and coupled to the inverting input 140 of the comparator amplifier 110 switches the resistor 126 into a different voltage dividing relationship with the voltage divider of resistors 114 and 116 to change the error threshold voltage established at juncture 118 from +6.0 volts to +5.5 volts by changing the voltage at output 136 which is conveyed through resistor 142 to junction 118. This provides hysteresis to the clock switch control circuit 54; after the over-current detection signal at input 112 has risen above the initial threshold, it must fall below this level to 5.5 volts before the output 56 will return to the normal low voltage state.

Likewise, if the over-current detection signal falls below the +4.0 volt threshold established at the juncture 128 of the voltage divider resistors 122 and 124, the output 138 of comparator amplifier 108 will change to a low voltage state. This low voltage state at output 138 and applied through common output connection 148 to the gate 150 turns off transistor 152 to raise the control signal voltage on output 56 to a high voltage state. A low voltage state at the output 138 and applied to the noninverting input 140 of the comparator amplifier 110 causes it to turn off. This changes the relationship of the resistor 126 with the voltage divider resistors 122 and 124 to increase the detection voltage threshold established at the juncture 128 from +4.0 volts to +4.5-volts. Again, this provides hysteresis for the circuit during the other half cycle of the clock signal; once the over-current detection voltage at input 112 falls beneath the initial threshold voltage of 4.0-volts, it must rise above this level to 4.5-volts before the output 138 will return to the normal high voltage state to cause the control signal voltage at output 56 to switch to the normal high voltage state.

Referring now to FIG. 6, the clock disable switch circuit 52 is seen to include a pair of transistors 156 and 158, preferably IRF7102 transistors made by International Rectifier, with their transconductive terminals connected in series between the clock signal input 51 connected to the series resistor 50, FIG. 2, and the clock line output 20. When these transistors 156 and 158 are turned on into a conductive state, then the clock signal at input 51 is coupled to the clock line output 20. When the transistors 156 and 158 are turned off into a nonconductive state the clock output line 20 is isolated from the clock signal input 51, the clock signal drive amplifier 48 and the remaining circuitry of the interface card 16. The gates of resistors 156 and 158 are connected in common to a voltage divider junction 160 between a pair of voltage divider resistors 162 and 164. The resistors 162 and 164 are connected in series between a +25-volts DC power source 165 and ground reference 90 and have resistance values of 10-Kohm and 39.2-Kohm, respectively. A gate drive transistor 166, preferably a BSS119 N-channel FET transistor made by Siemans, has its transconductive terminals connected between the juncture 160 and the gates of transistors 156 and 158 and ground reference 90. The gate of transistor 166 is connected to the inverting output terminal 168 of a D-latch 170, preferably a 14013 D-latch made by Motorola. The latch clock input terminal 172 is coupled to the switch control output 56 of the clock switch control circuit 54 of FIGS. 2 and 5, and the clear, or reset, latch terminal 174 is connected to clock disable input 176 which, in turn, is coupled to the system reset of the clock switch control circuit 54. The latch power terminal and the data input terminal of the latch 174 are connected in common to the ground reference 90.

Referring also to FIG. 5, a positive going transition at the drain of transistor 152 connected to switch control output 56 due to an over-current condition triggers the D-latch 174 to switch its noninverting output to a high voltage state 168. This high voltage state coupled to the gate of the transistor 166 causes the transistor to turn on to couple ground reference 90 to the gates of transistors 156 and 158. This low voltage at the gates of transistors 156 and 158 causes them to turn off to a nonconductive state. This nonconductive state protectively isolates the input clock line 51 and the remainder of the interface card 16 from the over-current condition on the output clock line 20 and also disables the generation of clock signals on the output clock line 20.

Once the D-latch 174 is set in response to an over-current condition, it remains set until a reset signal is coupled to the clear input terminal 174. This reset signal is initiated by the digital control and memory circuit and appears at an output terminal 176 of the optical coupler circuit 32 and coupled to the reset input 174 through a suitable connection (not shown). Once reset, the inverting output terminal 168 switches to a low voltage state which causes the transistor 166 to turn off. When transistor 166 is turned off, then the gates of the transistors 156 and 158 are driven to a high voltage state which causes them to turn on to a conductive state to reconnect the clock input signal at input 51 with the clock line output 20. When transistor 166 is off, resistors 162 and 164 form a voltage divider that biases the gates of the transistors 156 and 158 to approximately +20-volts. This bias voltage must be at least 4.50-volts more positive than the maximum clock signal amplitude during the conduction phase of the clock period. The maximum clock signal amplitude is computed as 11.0 volts [(Vcc-max)(Zo-max)]/[(Zo-max)+(R50)]=[(13.3)(100)]/[100+23.7]=13.6(0.808) =11.0-volts. The minimum bias voltage amplitude applied to the gates of transistors 156 and 158 must therefore be greater than =11.0-volts plus 4.5-volts, or +15.5-volts to insure a sufficiently low impedance state for the transistors 156 and 158.

Experiments with worst-case thresholds established for the load independent over-current clock line protector circuit 28 has shown that a positive going error voltage of as little as 660-mvolts and a negative going error of as little as 725-mvolts relative to the normal 5.00-volt level is capable of tripping the over-current protector circuit 28. An error signal of plus 1.356-volts and minus 1.275-volts, relative to the normal 5.00-volts threshold, has always tripped the over-current clock line protector circuit 28 during testing.

There are three primary fault conditions to which the clock line over-current protection circuit 28 responds in order to disconnect the clock line 20 from the clock signal generating circuitry before component damage can occur. Referring again to FIG. 1, these conditions are: (1) A short circuit between the clock line 20 and the DC power bus, or supply voltage line, 22; (2) A short circuit between the clock line 20 and the DC common bus, or common ground line, 24; and (3) A short circuit between the clock line 20 and the bus data line 26.

The existence of any one of these conditions has a high probability of causing component damage and circuit failure, if allowed to continue for more than a few milliseconds, in severe cases, or for more than several seconds, in less severe cases. The over-current fault detector thresholds indicated here are designed to trigger the clock switch and disable the clock circuit in less than twenty microseconds in response to a clock line over-current of one ampere or more. In the event of lower over-currents in the 100–200-ma range, the protector circuit 28 responds in no more than several milliseconds.

The data line drive circuit (not shown) is a current source of 30-ma, and as such, does not generate sufficient error voltage to trigger a clock line disable signal, in the event of a short between the data line 26 and the clock line 20. However, as noted with reference to FIG. 2, the interface card 16 includes an over-current fault detection circuit for the data line 26 which provides protection by disabling the data line driver in the event of damaging current levels resulting from a short between the data line 26 and the clock line 20. Thus, the clock line over-current protector 28 in combination with the data over-current protector 44 provides to the clock line for all of the possible types of short circuits noted above including a short circuit between the clock line 20 and the data line 26.

While a preferred embodiment has been described above in detail, it should be appreciated that many variations with respect to these details may be made without departing from the scope of the invention as defined in the appended claims.

I claim:

1. A clock line over-current protector, comprising:
    a switch for selectively interconnecting a source of clock signals and the clock line; and
    means for controlling the switch to disconnect the source of clock signals from the clock line in response to a difference in the clock line current magnitude during clock phases of opposite polarity exceeding a preselected threshold.

2. The clock line over-current protector of claim 1 in which said controlling means includes means for providing hysteresis to the operation of the switch.

3. The clock line over-current protector of claim 1 in which said clock phases of opposite polarity are successive phases of a full cycle of the clock cycle.

4. The clock line over-current protector of claim 1 including
    means to latch the switch in a state that disconnects the clock line from the source of clock signals, and
    means to reset the latch means to unlatch the switch and reconnect the clock line with the source of clock signals.

5. The clock line over-current protector of claim 1 including means for producing a current sensor signal representative of the magnitude of the current through the switch when it is conducting clock line current.

6. The clock line over-current protector of claim 5 in which the current sensor signal producing means includes
    a resistor connected in series between the switch and the clock signal source, and
    means connected across the series resistor for generating the current sensor signal with a current magnitude that is proportional to a voltage developed across the series resistor.

7. The clock line over-current protector of claim 6 in which the current sensor signal generating means includes a differential amplifier with inverting and noninverting inputs, respectively coupled to opposite sides of the series resistor.

8. The clock line over-current protector of claim 5 in which the switch controlling means includes a detection circuit for integrating the current sensor signal to produce an over-current detection signal with a magnitude that varies with respect to a preselected reference directly with the integral of the current sensor signal over at least a full cycle of the current sensor signal.

9. The clock line over-current protector of claim 8 in which the over-current detection circuit includes
    a first integrating circuit for producing a positive integral signal relative to the reference representative of the integral of the sensor signal during transitions of a first polarity of the current sensor signal,
    a second integrating circuit for producing a negative integral signal relative to the reference representative of the integral of the sensor signal during transitions of a second polarity of the current sensor signal opposite to the first polarity, and
    means for summing the positive integral signal with the negative integral signal to produce the over-current detection signal, said over-current detection signal varying above and below the reference to the extent the positive integral signal is greater than and less than the negative integral signal.

10. The clock line over-current protector of claim 9 in which
    the first integrating circuit includes a first capacitor and a first rectifier with an anode and a cathode, said capacitor having one side connected to the reference and an opposite side connected to the cathode of the first rectifier and through the anode to the a detection circuit input for receiving the current sensor signal during phases when the first rectifier is forwardly biased into a conductive state to conduct sensor current into the first capacitor, and
    said second integrating circuit includes a second capacitor and a second rectifier with an anode and a cathode, said second capacitor having one side connected to the reference and an opposite side connected to the anode of the second rectifier and through the cathode of the second rectifier to the detection signal input for receiving the current sensor signal during opposite phases when the second rectifier is positively biased into a conductive state to conduct current into the second capacitor and the first rectifier is reverse biased into a nonconductive state.

11. The clock line over-current protector of claim 10 in which the first capacitor and the second capacitor are substantially the same and the first rectifier and the second rectifier are substantially the same.

12. The clock line over-current protector of claim 10 in which the summing means includes a pair of resistors respectively interconnecting the juncture between the first rectifier and the first capacitor and the juncture between the second rectifier and the second capacitor with a detection circuit output at which the first integral signal and the second integral signal are summed to produce the over-current detection signal.

13. The clock line over-current protector of claim 12 in which the pair of resistors is substantially the same.

14. The clock line over-current protector of claim 12 in which
the first capacitor and the second capacitors both have a capacitance on the order of 0.01-microfarad, and
the pair of resistors both have a resistance on the order of 20-kilohm.

15. The clock line over-current protector of claim 8 in which the switch controlling means includes a clock switch control circuit for providing a switch control signal to actuate the switch in response to the over-current detection signal varying from a switch control reference by a preselected threshold amount.

16. The clock line over-current protector of claim 15 in which the switch controlling means includes
means for establishing a positive threshold level above the switch control reference,
means for establishing a negative threshold below the switch control reference, and
means responsive to the over-current detection signal assuming a value outside a range of values between the positive threshold and the negative threshold generating a switch actuation signal to turn off the switch.

17. The clock line over-current protector of claim 15 including means responsive to the over-current signal assuming a value outside of the range to decrease the range of values the over-current detection signal must assume in order for the switch actuation signal generating means to turn on the switch after it has been turned off.

18. The clock line over-current protector of claim 1 in combination with an interface card for interfacing the clock line and a data line with a host computer in a control system, said interface card including a over-current protector circuit and both the over-current detector and the switch controlling means being responsive to a short circuit between the clock line and the data line to protect the respective lines with which they are associated.

* * * * *